Patented Dec. 5, 1922.

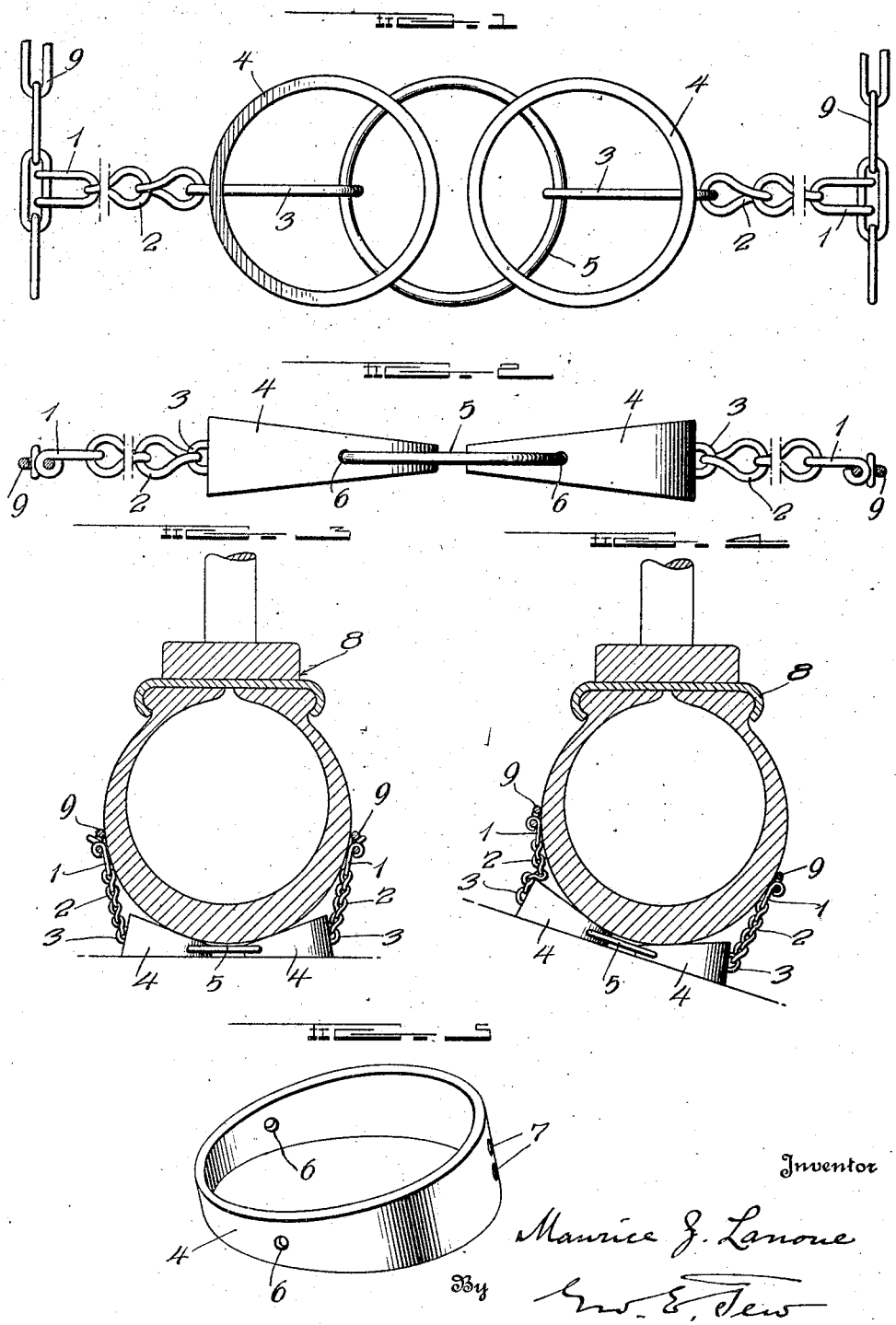

1,437,761

UNITED STATES PATENT OFFICE.

MAURICE Z. LANOUE, OF ASHKUM, ILLINOIS.

ANTISKID DEVICE.

Application filed March 13, 1922. Serial No. 543,280.

*To all whom it may concern:*

Be it known that I, MAURICE Z. LANOUE, a citizen of the United States, residing at Ashkum, in the county of Iroquois and State of Illinois, have invented certain new and useful Improvements in Antiskid Devices, of which the following is a specification.

This invention is a non-skid device, or chain, for automobile wheels and its object is to provide an improved chain of this character and one which will prevent skidding in any direction of automobile wheels on any surface.

A further object is to provide a chain which can be made of fewer parts than other devices of this kind.

A further object is to provide a chain which will especially prevent side-skid of a wheel.

Further objects will be apparent from the following description and the accompanying drawings, in which Fig. 1 is a bottom plan view of the device. Fig. 2 is a side elevation. Fig. 3 is a side view, showing the device applied to an automobile wheel. Fig. 4 is a similar view, showing the wheel on an inclined surface. Fig. 5 is a perspective of one of the members of the device.

The device consists of pairs of wedge-shaped rings 4, which are provided with two holes 6 near the inner side thereof. These rings are wedge-shaped or tapered as seen from the front or rear, the narrower ends being at the middle, adjacent to each other, and the wide ends at the outside, to agree with the cross sectional curvature of the tire. Passing through the holes 6 and connecting the rings 4 together is another ring 5, as shown in Fig. 1. At the outer or larger side of the rings 4 are holes 7 through which links 3 pass. The links 3 are connected to the ring 5, inside the rings 4. At the outer ends of the links 3 are connected any suitable number of links 2, and to these are fastened hooks 1, which are adapted to be fastened to side chains 9, or any other suitable means to fasten the device to a wheel.

When the device is applied to a wheel 8, it presents a flat or straight surface to the ground, the bottoms of the rings 4 contacting therewith.

The rings 4 offer a large surface to the ground and prevent spinning of the wheels. Also, there can be no side-skid as when traveling on an inclined surface or going around a curve, one of the rings 4 will form a wedge between the wheel and the ground (see Fig. 4). In this figure, the lower link forms a wedge and so prevents skidding down to the side.

The device can be quickly and easily manufactured and altho it grips the tire in operation, it will not injure the same, as in no wise does it pinch it. The device, when applied to a tire, is not wider than the tire and will therefore not cause a wheel to stick in a rut. In fact, due to the depth of the rings 4 at their outer sides, it is very useful on a muddy road, as the links act as hooks. However, on a smooth road, it will not cause a bumping or rough riding, as the greatest depth of the rings is at the side and not directly under the center of the wheel. The rings 4 can be made of hardened steel and will therefore give a maximum amount of wear, and, as these links are the only parts that come in contact with the road, a chain so constructed will give long service.

I claim:

1. A device of the character described, comprising a pair of wedge-shaped rings, means to connect the same together near their narrower sides, and means fastened to said rings to apply the same to a wheel tire.

2. A device to prevent skidding of automobile wheels, comprising two wedge-shaped rings, means fastening said rings together, said rings presenting outer straight sides to the ground, and having inner inclined sides adapted to fit against an automobile tire.

3. An anti-skid device comprising a pair of rings each of which is wedge-shaped in elevation, the narrower ends of said rings being connected together, and the wider ends of said rings being provided with means to attach the same to a wheel.

4. An anti-skid device comprising a pair of hollow wedge-shaped members, the hollow sides of which are presented outwardly for contact with the ground, a connecting ring between the narrower ends of said members, and means to attach said members to a wheel.

5. An anti-skid device comprising a pair of hollow wedge-shaped members, the hollow sides of which are presented outwardly for contact with the ground, a connecting ring between the narrower ends of said members, and means to attach said members to a wheel, said means including links connected to said ring and extending through one side of the members.

In testimony whereof, I affix my signature in presence of two witnesses.

MAURICE Z. LANOUE.

Witnesses:
 HENRY DUSHARME,
 ALBERT L. LEMENAGER.